June 23, 1970          H. HEITZER          3,516,534
CONVEYOR AXLE SUPPORT
Filed March 6, 1968
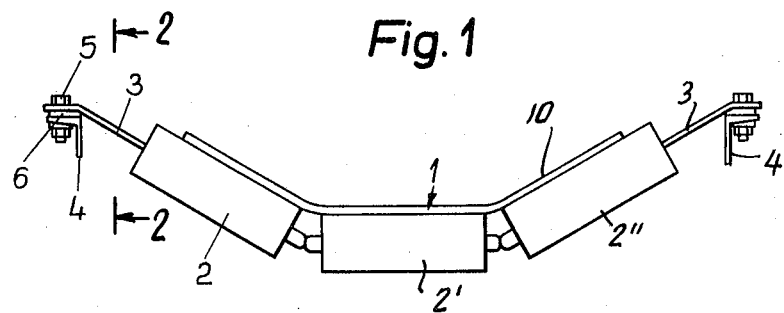
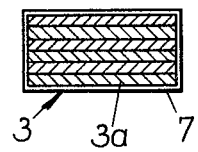
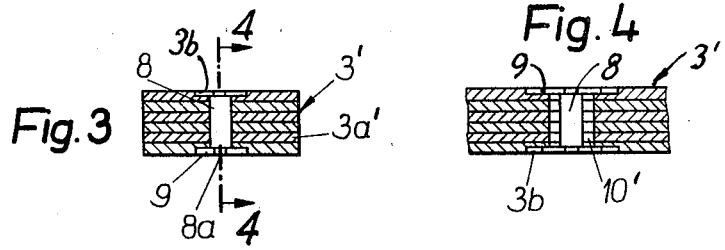
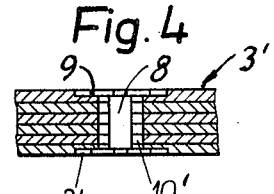
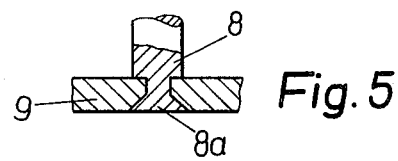
Inventor
HEINRICH HEITZER
BY
McGlew & Toren
ATTORNEY

United States Patent Office

3,516,534
Patented June 23, 1970

3,516,534
CONVEYOR AXLE SUPPORT
Heinrich Heitzer, Nuess (Rhine), Weckhoven, Germany, assignor to Demag-Lauchhammer Maschinenbau und Stahlbau G.m.b.H., Dusseldorf-Benrath, Germany
Filed Mar. 6, 1968, Ser. No. 710,886
Claims priority, application Germany, Mar. 7, 1967, D 52,444
Int. Cl. B65g 15/08
U.S. Cl. 198—192
7 Claims

ABSTRACT OF THE DISCLOSURE

A fixed support or axle member for a set of bearing pulleys of trough-shaped conveyor belts includes a laminate made up of a plurality of horizontally elongated flat plates arranged in a substantially vertical stack. The plates are made of a spring steel and the laminate package may be covered with an outer cover of a synthetic material or held together by through-bolts or rivets. The construction provides vertical resiliency and longitudinal stability for supporting the bearing pulleys.

SUMMARY OF THE INVENTION

This invention relates in general to supporting structures for conveyors and in particular, to a new and useful stationary axle support for a set of bearing pulleys of trough-shaped conveyor belts, which support comprises a laminate of flat plates.

Axles for supporting bearing pulleys so that they can move by means of friction or roller bearings and adapt to the respective mold of a conveyor belt have been made of devices such as ropes, round link chains, or shafts made of spring steel in order to impart a certain flexibility to the bearing pulleys. The flexibility which is imparted exists not only in a vertical direction but also in a horizontal direction and this horizontal flexibility results in a disadvantage and produces a horizontal pushing force on a conveyor belt during operation. This causes a fast advance of the center bearing pulleys relative to the fixed points of the axles. This causes a loss of the right angle position of the outer bearing pulleys relative to the longitudinal axis of the conveyor belt. As a result a relative movement of the belt in respect to the contacting surfaces of the pulleys will result causing a loss of power due to the increase of friction. In addition, a so-called negative fall of the bearing pulleys may cause or at least favor an oblique movement of the conveyor belt.

In order to eliminate the disadvantages referred to above it is known to prevent the flexible axis from leaving the gravitational plane extending between its suspension points in its intermediate area by using devices which act in that area. This measure, however, is complex and expensive and these disadvantages are eliminated by the present invention by the use of a novel axle member.

In accordance with the present invention a fixed axle or support for the bearing pulleys is made up of a laminate composed of a plurality of flat plate elements having their longitudinal axis arranged parallel to the longitudinal axis of the conveyor. The laminate supports the bearing pulleys or cylinders so that they have resilience in the vertical directions but rigidity in the horizontal directions. By proper selection of a cross section of an individual element of the lamellae package it is possible to maintain the desired alignment between the individual bearing pulleys in the most economical manner.

In accordance with a further embodiment of the invention the laminate may consist of spring steel or synthetic materials. In addition to the selection of the number, thickness and width of the laminate the selection of the material adds to the possibility of variation of the resilient properties and the transverse stability of the axle.

The laminate is guided against lateral displacement by pins extending through oblong holes or oversized slots in an embodiment of the invention. Pins are provided with projections which are engaged with discs. The discs are carried in recesses of the outer lamina or plate. The discs prevent any engagement or catching of the axle when it is inserted into the bearing pulleys. The distance between the discs is selected so that the plates of the laminate are not pressed and may be displaced in a longitudinal direction.

In a still further embodiment of the invention the laminate composed of a plurality of flat plates is surrounded by a sheet of rubber or synthetic material. This outer casing prevents contamination of the plates by the goods being conveyed or by dust, chemicals and the like. It also prevents matter from eminating from the laminate or lubricant from entering into sensitive goods which are conveyed, for example, of food stuffs, In addition, the casing prevents a lateral displacement of the individual plate elements relative to each other so that securing pins extending through the plates are not required.

Accordingly, it is an object of the invention to provide a stationary axle member for supporting bearing pulleys of a trough-shaped belt conveyor which comprises a laminate made up of a plurality of individual plate elements arranged to provide for vertical flexibility but substantial rigid horizontal orientation and support of the pulleys.

A further object of the invention is to provide a laminate axle structure for conveyors which includes a plurality of flat plate elements arranged with their horizontal axes parallel to the axis of the conveyor and having a through bolt extending through an oversized slot defined through the laminate and secured at its outer ends to hold the assembly together.

A further object of the invention is to provide an axle support for trough-shaped belt conveyors which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partially schematic front elevational view of a conveyor having a stationary axle support constructed in accordance with the invention;

FIG. 2 is an enlarged transverse section of the axle support indicated in FIG. 1 taken along the lines 2—2 of FIG. 1;

FIG. 3 is a view similar to FIG. 2 of another embodiment of the invention;

FIG. 4 is a section taken along the line 4—4 of FIG. 3; and

FIG. 5 is an enlarged partial detail of the section indicated in FIG. 4.

DETAILED DESCRIPTION OF THE PREFERRED EMBODIMENTS

Referring to the drawings in particular, the invention embodied therein FIGS. 1 and 2 comprises a trough-shaped conveyor generally designated 1 which includes a U-shaped or trough-shaped conveyor belt 10 which is supported for running all over bearing pulleys 2, 2', and 2". The outer bearing pulleys 2 and 2" are supported with their axes extending obliquely and the center bearing pulley 2' is supported with its axis extending substantially horizontally.

In accordance with the invention the support means for the conveyor 1 include fixed axle members or supports 3 which are supported at their outer ends on fixed support elements 4, 4, respectively. The outer end of each axle 3 is secured to a respective support 4 by means of bolts 5 with a rounded off breakage protector member or washer 6 being interposed therebetween.

In accordance with the invention the axle members 3 comprise laminates made up of plurality of flat plates 3a arranged with their longitudinal axes parallel to the axis of a conveyor. An outer coating or casing 7 made of a rubber or synthetic material is applied around the complete bundle of plates as indicated in FIG. 2.

In the embodiment of FIG. 3 no outer casing is employed, but a laminate 3' is made up of a plurality of individual horizontal plates 3a', held together by means of a securing pin 8. Pin 8 is secured at its respective ends to respective discs 9, 9 which are riveted onto projections 8a of the pin as indicated in FIG. 5. The discs 9 fit into grooves 3b which are defined in the outer plates 3a' of the laminate 3'. All of the plates 3a' of the laminate 3' are provided with an oversized hole or oblong hole 10' which permits displacement of the individual plates relative to each other. The disc 9, however, may be made of a size so that no displacement may be achieved by the outermost plates.

While specific embodiments of the invention have been shown and described in detail to illustrate the application of the inventive principles, it will be understood that the invention may be embodied otherwise without departing from such principles.

What is claimed is:

1. A conveyor construction comprising a pair of laterally spaced fixed supports, a stationary axle member having respective outer ends secured to respective ones of said supports and extending obliquely downwardly from each support and having a central portion which is substantially horizontal, a horizontal bearing roller supported from the central area of said axle member and an oblique roller supported on the oblique portion of each side of each central bearing roller, a conveyor belt positioned over said central and at least parts of said end rollers, said axle member comprising a laminate of a plurality of flat plates having axes which are substantially parallel to the axis of the conveyor.

2. An axle according to claim 1, wherein said laminate comprises plates of spring steel.

3. An axle according to claim 1, wherein said laminate comprises plates of synthetic material.

4. An axle according to claim 1, wherein said laminate includes a plurality of metal plates arranged in a vertical stack and a casing around the outside of said stack of a synthetic material.

5. An axle according to claim 1, including an oblong slot extending through said laminate, and a pin extending through said slot of a smaller size than said slot and secured at each end to hold said laminate plates together but permitting longitudinal movement of the intermediate plates of said laminate.

6. An axle according to claim 1, wherein said pins include a projection at each end, a flat disc recessed into the outermost one of said plates of said laminate and engaged around a respective projection of a respective end of each of said pins.

7. An axle according to claim 1, wherein said laminate comprises a plurality of spring metal flat plates having their longitudinal axis substantially parallel to the axis of the conveyor and arranged in a vertical stack, and casing surrounding the exterior of said stack made of a resilient material.

References Cited

FOREIGN PATENTS 107,056    4/1875    France.

EDWARD A. SROKA, Primary Examiner